United States Patent
Chiou

(10) Patent No.: US 7,340,779 B2
(45) Date of Patent: Mar. 11, 2008

(54) FLEXIBLE SPIKE/BALLISTIC PENETRATION-RESISTANT ARTICLES

(75) Inventor: Minshon J. Chiou, Chesterfield, VA (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 159 days.

(21) Appl. No.: 10/610,674

(22) Filed: Jul. 1, 2003

(65) Prior Publication Data

US 2005/0003727 A1    Jan. 6, 2005

(51) Int. Cl.
*F41H 1/02* (2006.01)
*B32B 27/12* (2006.01)

(52) U.S. Cl. .................. 2/2.5; 89/36.01; 89/36.02; 89/36.05; 428/911; 442/134; 442/135

(58) Field of Classification Search ............... 442/134, 442/135; 428/920, 921, 911; 2/2.5; 89/36.01, 89/36.02, 36.05
See application file for complete search history.

(56) References Cited

U.S. PATENT DOCUMENTS

| | | | |
|---|---|---|---|
| 5,565,264 A | 10/1996 | Howland | |
| 5,578,358 A | 11/1996 | Foy et al. | |
| 5,622,771 A | 4/1997 | Chiou et al. | |
| 5,837,623 A | 11/1998 | Howland | |
| 5,960,470 A | 10/1999 | Bachner, Jr. | |
| 5,976,996 A | 11/1999 | Howland | |
| 6,103,646 A | 8/2000 | Chiou | |
| 6,131,193 A | 10/2000 | Bachner, Jr. | |
| 6,133,169 A | 10/2000 | Chiou et al. | |
| 6,162,746 A | 12/2000 | Chiou | |
| 6,219,842 B1 | 4/2001 | Bachner, Jr. | |

FOREIGN PATENT DOCUMENTS

WO    WO 03/053676 A    7/2003

*Primary Examiner*—Ula C Ruddock

(57) ABSTRACT

An article is disclosed to protect a wearer from spike and ballistic threats that is made from a spike resistant panel and a ballistic resistant panel. Each panel is made from flexible fabric layers. The fabrics in the spike resistant panel are made from first yarns having a linear density of from 50 to 600, with a plurality of filaments. There are 40 to 100 first yarns per inch in both the warp and fill directions. The fabrics in the ballistic resistant panel are made from second yarns having a linear density of from 100 to no more than 840 denier with a plurality of filaments, which provide from 20,000,000 to no more than 90,000,000 filament crossovers per square inch. There are 5 to less than 40 second yarns per inch in both the warp and fill directions

23 Claims, 1 Drawing Sheet

FLEXIBLE SPIKE/BALLISTIC PENETRATION-RESISTANT ARTICLES

BACKGROUND OF THE INVENTION

1. Field of the Invention

This invention relates to flexible garments made for protection from ballistic threats and against spike (or puncture) threats from sharp pointed instruments, such as picks, shanks, awls, or the like. Such garments must be as flexible as possible to ensure comfort sufficient that the garment will be readily worn. Flexible garments that provide for protection against such threats are also commonly known as body armor.

2. Description of Related Art

Body armor that protects the wearer against ballistic threats, or bullets, has been commercially available for some time.

Body armor that protects a wearer against spike (or puncture) threats became commercially available in the mid 1990s. For instance, U.S. Pat. No. 5,578,358 (Foy et al) issued Nov. 26, 1996 and U.S. Pat. No. 5,622,771 (Chiou), issued Apr. 22, 1997, disclose flexible spike penetration resistant articles consisting essentially of fabric woven to a fabric tightness factor of at least 0.75 from aramid yarn of less than 500 dtex.

Body armor made for protection against ballistic threats is not necessarily effective against spike threats. The converse is also true, that body armor that protects a wearer against spike threats is not necessarily effective against ballistic threats.

More recently, body armor to protect a wearer against multiple types of penetration threats, including spike and ballistic threats, in a single protective garment has become available. For example, U.S. Pat. No. 6,103,646 (Chiou) discloses a combination of layered structures to protect against spike and ballistic threats. The outer face is a penetration strikeface, and includes layers of fabrics tightly woven from aramid yarns of linear density less than 500 dtex. The inner face includes ballistic layers.

U.S. Pat. No. 5,960,470 (Bachner) discloses a spike resistant panel comprising a plurality of flexible layers of woven sheets having a weave of at least 60 ends/inch of aramid fiber, wherein with the aramid fiber is constructed of filaments, which provide from 50,000,000 up to 90,000,000 filament crossovers per square inch (from 7,750,015 up to 13,950,027 filament crossovers per square cm), and at least two sub-panels. This patent also discloses that the subject spike resistant panel can be combined with a ballistic resistant panel where the ballistic resistant panel is positioned at the strike face of the ballistic/spike protective garment, or the ballistic resistant panel is positioned between two spike resistant panels. Further, U.S. Pat. Nos. 6,131,193 (Bachner) and 6,219,842 (Bachner) disclose a spike and ballistic resistant garment comprising a spike resistant panel with aramid fibers which provide from 50,000,000 up to 90,000,000 filament crossover per square inch (from 7,750,015 up to 13,950,027 filament crossover per square cn), and a ballistic resistant panel of at least one of woven fiber having greater than 90,000,000 filament crossover per square inch (than 13,950,027 filament crossover per square cm), and optionally a composite panel.

SUMMARY OF THE INVENTION

In a first aspect of the invention a spike and ballistic resistant article comprises a spike resistant panel and a ballistic resistant panel. The spike resistant panel has a plurality of flexible layers of a first fabric positioned adjacent to one another. The first fabric is made of a plurality of first yarns in a warp direction and a fill direction, wherein the first yarns have a linear density of from 50 to 600 denier (55 to 660 dtex) and comprise a plurality of first filaments and there are from 40 to 100 first yarns per inch (15.7 to 39.4 first yarns per cm) in both the warp and fill directions.

The ballistic resistant panel has a plurality of flexible layers of a second fabric positioned adjacent to one another. The second fabric layers are made of a plurality of second yarns in a warp direction and a fill direction, wherein the second yarns have a linear density of from 100 to no more than 840 denier (from 110 to no more than 930 dtex) and comprise a plurality of second filaments which provide from 20,000,000 to no more than 90,000,000 filament crossovers per square inch (from 3,100,006 to no more than 13,950,027 filament crossovers per square cm) in said second fabric. There are 5 to less than 40 second yarns per inch (2 to less than 15.7 second yarns per cm) in both the warp and fill directions.

It has also been discovered that even greater improvements in ballistic performance while maintaining excellent performance against spike threats are realized wherein the spike and ballistic resistant article comprises a spike resistant panel with fibers which provide from 25,000,000 to no more than 300,000,000 filaments crossovers per square inch (from 3,875,007 to no more than 46,500,093 filaments crossovers per square centimeter, and a ballistic resistant panel with yarns which provide from 20,000,000 to no more than 90,000,000 filament crossovers per square inch (from 3,100,006 to no more than 13,950,027 filament crossovers per square centimeter.

Further scope of applicability of the present invention will become apparent from the detailed description given hereinafter. However, it should be understood that the detailed description and specific examples, while indicating embodiments of the invention, are given by way of illustration only, because various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

DETAILED DESCRIPTION

Figure 1:
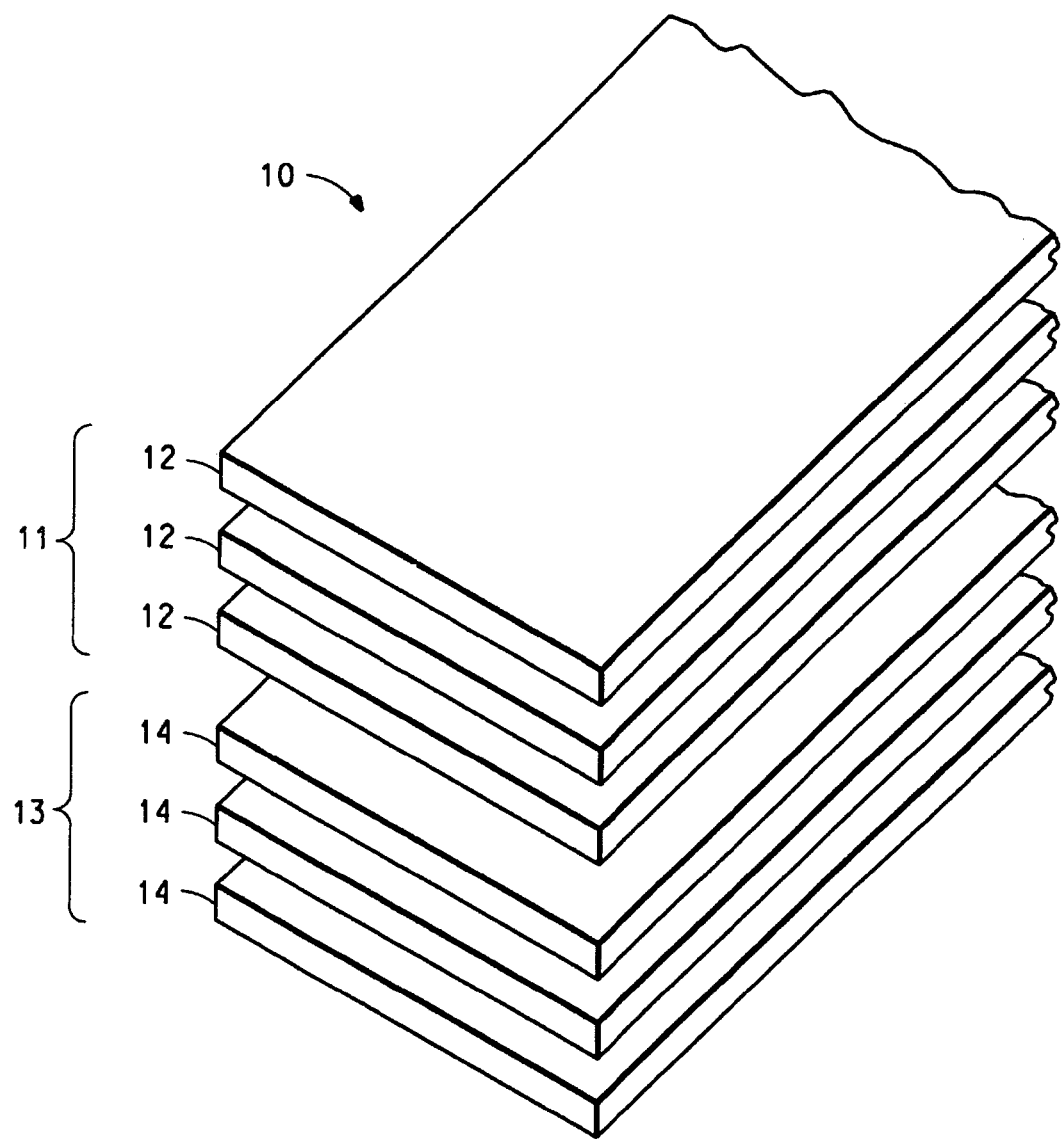
FIG. 1 shows an expanded perspective view of a spike and ballistic resistant article of the invention.

The protective article of this invention was specifically developed to provide dual protection from penetration by spike (or puncture) threats from sharp pointed instruments, such as picks, shanks, awls, or the like as well as protection from ballistic threats. It is becoming ever more important that police, correctional officers, and security personnel have simultaneous protection from both spike threats and ballistic threats in the same protective garment.

As a general rule, flexible spike resistant articles are made using layers of fabric woven from yarn material with high tenacity and toughness; and the degree of penetration resistance is, among other things, a function of the linear density of the yarn and tightness of the weave. The lower the linear density of the yarn and the tighter the weave, the greater the penetration resistance.

As a general rule, flexible ballistic resistant articles are made using layers of fabric made from yarn material with high tenacity and toughness in enough layers to be effective against a specified threat. Fabrics for ballistic protection generally use yarns with relatively high linear densities and, when woven, have little regard for tightness of weave, except to avoid extremely tight weaves to avoid damage to the yarn fibers resulting from the rigors of weaving.

To make a protective structure effective for threats from penetration by both spike and ballistic threats combinations of materials have been proposes as previously pointed out. The inventor herein has discovered an entirely different combination of materials, which yields a remarkable improvement in protection.

The particular combination of this invention, utilizing spike resistant material and ballistic resistant material, exhibits good ballistic protection and good spike resistance, and has superior performance as compared to previously available protective structures effective for threats from both penetration by spike and ballistic threats. Quite remarkably, it has also been discovered that the flexible garments that provide this superior protection from ballistic and spike threats are produced from fibers that do not suffer from production limitations that lead to higher production costs.

A spike and ballistic resistant article of the invention can be made by placing a spike resistant panel made up of a plurality of spike resistant fabric layers and a ballistic resistant panel made up of a plurality of ballistic resistant fabric layers together, in face to face relation, with other layer materials there between or not, as desired. The layers, which form the panel of the article, can be joined by, for example, being sewn together or they can be stacked together and held, for example, in a fabric envelope. The layers, which constitute each panel, are usually placed together and the composite can, thereby, be seen as a structure having distinct sections of layers.

The FIG. 1 shows the spike and ballistic resistant article 10 of this invention with a ballistic resistant panel 11 of layers 12 of ballistic resistant woven fabric and a spike resistant panel 13 of layers 14 of spike resistant woven fabric.

The spike resistant panel is made of a plurality of flexible layers of spike resistant fabric positioned adjacent to one another, the fabric being made of a plurality of first yarns in the warp direction and a plurality of first yarns in the fill direction. The first yarn of the spike resistant panel has a linear density of from 50 to 600 denier (55 to 660 dtex). There are from 40 to 100 yarns per inch (15.7 to 39.4 yarns per cm) in both the warp and fill directions. In one embodiment, there are 45 to 80 yarns per inch (17.7 to 31.5 yarns per cm) in both the warp and fill directions.

The first yarns of the spike resistant panel are made from a plurality of filaments. In one embodiment, the filaments provide from 25,000,000 (3,875,007) to no more than 300,000,000 (46,500,093; more than 90,000,000 (13,950,027) to no more than 250,000,000 (38,750,077); or from 25,000,000 (3,875,007) to less than 50,000,000 (7,750,015) filament crossovers per square inch (per square cm) in the fabric of the spike resistant panel. In another embodiment, the yarn of the spike resistant panel has a tenacity of at least 10 g/denier (9 g/dtex) and an elongation break of at least 2%. In another embodiment the first yarns of the spike resistant panel have a linear density of from 50 to 600 denier (55 to 660 dtex), preferably 100 to 500 denier (110 to 550 dtex) and the filaments have a linear density of from 0.3 to 8.0 denier (0.33 to 8.9 dtex), preferably 0.5 to 4.0 denier 0.55 to 4.44 dtex). In another embodiment, the spike resistant panel has an areal density of from 0.15 to no more than 1.50 pounds per square foot (from 732 to no more than 7,320 grams per square meter), preferably 0.2 to no more that 0.90 pounds per square foot (preferably 976 to no more than 4,394 grams per square meter).

The ballistic resistant panel is made of a plurality of flexible layers of a ballistic resistant fabric positioned adjacent to one another, the fabric layers being made of a plurality of second yarns in a warp direction and a plurality of second yarns in a fill direction. The second yarns of the ballistic resistant panel have a linear density of from 100 to no more than 840 denier (from 110 to no more than 930 dtex) and there are 5 to less than 40 second yarns per inch (2 to less than 15.7 second yarns per cm) in both the warp and fill directions. The yarns of the ballistic resistant panel comprise a plurality of filaments that provide from 20,000,000 (3,100,006) to no more than 90,000,000 (13,950,027), preferably 35,000,000 (5,425,010) to 85,000,000 (13,175,026), filament crossovers per square inch (per square cm) in the fabric of the ballistic resistant panel. In one embodiment, there are 10 to 36 yarns per inch (3.94 to 14.2 yarns per cm) in both the warp and fill directions. In another embodiment, the yarns of the ballistic resistant panel have a linear density of from 100 to 800 denier (110 to 890 dtex), preferably 150 to 750 denier (167 to 833 dtex) and the filaments have a linear density of from 0.3 to 8.0 denier (0.33 to 8.9 dtex), preferably 0.5 to 4.0 denier (0.55 to 4.44 dtex). In another embodiment, the yarn of the ballistic resistant panel has a tenacity of at least 10 g/denier (9 g/dtex) and an elongation break of at least 2%.

The ballistic and spike resistant panels may be placed in virtually any order. In one embodiment the ballistic resistant panel is the penetration strike face, and in another embodiment, the spike resistant panel is the penetration strike face. It is preferred for the spike resistant panel to be on the penetration strike face.

More than one spike resistant panel and/or ballistic resistant panel may used to make up the spike and ballistic resistant article. For example, the spike and ballistic resistant article may comprise a spike resistant panel as the strike face, with an adjacent ballistic resistant panel and then another spike resistant panel as an inner face for positioning against the body of the wearer.

In another embodiment the layers of the ballistic resistant fabric and of the spike resistant fabric are not intermixed such that the ballistic and spike resistant panels are substantially distinct. In another embodiment the layers of the ballistic resistant fabric and the spike resistant fabric are intermixed such that the ballistic and spike resistant panels are not distinct. However, it is preferred that the layers and the panels should be arranged with the ballistic and spike resistant panels being substantially distinct.

Preferably, the fabric of at least one layer of the first and second plurality of layers 12,14 is woven. Most preferably, all the fabric of the first and second plurality of layers 12,14 is woven. However, such fabric can be a woven, knitted, or non-woven structure. By non-woven is meant a network of fibers, including unidirectional (if contained within a matrix resin), felt, and the like. By woven is meant any fabric weave, such as, plain weave, crowfoot weave, basket weave, satin weave, twill weave, and the like. Plain weave is the most common.

The plurality of layers of the ballistic resistant fabric may be made of the same or different material. Likewise, the plurality of layers of the spike resistant fabric can be the same or different material. The layers of the ballistic resistant fabric and of the spike resistant fabric may be of the same or different material.

The layers of the ballistic and/or spike resistant fabrics may also independently contain a matrix resin or binder. In one embodiment, the layers of fabric are substantially surrounded and substantially impregnated with the matrix resin, which comprises a thermoset or thermoplastic resin, or mixtures thereof.

A wide variety of suitable thermoset and thermoplastic resins and mixtures thereof are well known in the prior art and can be used as the matrix resin. For example, thermoplastic resins can comprise one or more polyurethane, polyimide, polyethylene, polyester, polyether etherketone, polyamide, polycarbonate, and the like. Thermoset resins can be one or more epoxy-based resins, polyester-based resins, phenolic-based resins, and the like, preferably a polyvinlybutyral phenolic resin. Mixtures can be any combination of the thermoplastic resins and the thermoset resins.

In one embodiment there are 2 to 32, preferably 5 to 25, layers of the spike resistant fabric. In another embodiment, there are 10 to 70, preferably 15 to 60, layers of the ballistic resistant fabric.

In one embodiment, the V50 ballistic performance of the spike and ballistic resistant article of the invention against a 9 mm bullet is at least 350 m/sec. In another embodiment, the spike and ballistic resistant article of the invention, being a first article, has a ballistic V50 performance which is greater than that of a second article comprising the spike resistant panel and the ballistic resistant panel having the same areal density as the first article but having a number of filament crossovers per square inch (per square cm) in the ballistic resistant panel of the second article of more than 90,000,000 (13,950,027).

Other layer materials which may be placed between the spike resistant panel and ballistic panel include, for example, cushioning materials, adhesive materials, water proofing materials, and the like.

Yarns used to make the spike resistant and ballistic resistant fabric layers in the present invention can be made from organic fibers comprised of polyamide, polyolefin, polybenzoxazole, polybenzothiazole, poly{2,6-diimidazo[4,5-b4',5'-e] pyridinylene-1,4(2,5-dihydroxy)phenylene} (PIPD), or mixtures thereof. Preferably, the yarns are made of polyamide.

When the polymer is polyamide, aramid is preferred. By "aramid" is meant a polyamide wherein at least 85% of the amide (—CO—NH—) linkages are attached directly to two aromatic rings. Suitable aramid fibers are described in W. Black et al, *Man-Made Fibers—Science and Technology*, Vol.2, p.297 (Interscience Publishers 1968), in a section titled Fiber-Forming Aromatic Polyamides. Aramid fibers are also disclosed in U.S. Pat. Nos. 4,172,938; 3,869,429; 3,819,587; 3,673,143; 3,354,127; and 3,094,511.

Additives can be used with the aramid, and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide)(PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

When the polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE). Similarly, polypropylene is a predominantly linear polypropylene material of preferably more than one million molecular weight. High molecular weight linear polyolefin fibers are commercially available. Preparation of polyolefin fibers is discussed in U.S. Pat. No. 4,457,985.

Polybenzoxazole (PBO) and polybenzothiazole (PBZ) are suitable, such as described in WO 93/20400. Polybenzoxazole and polybenzothiazole are preferably made up of repetitive units of the following structures:

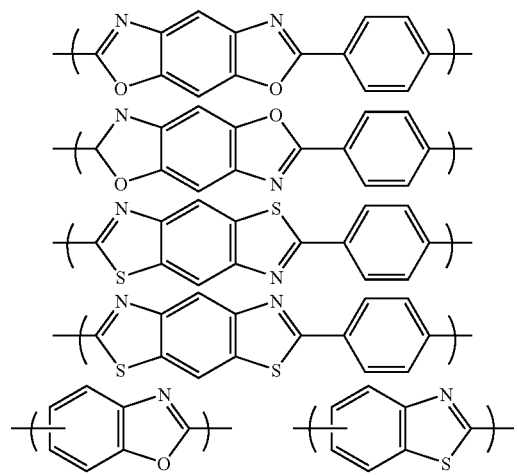

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in the aforementioned International Publication WO 93/20400.

The article of the invention will be further described below with reference to the working examples. It should be noted however that the concept of the invention will not be limited at all by these examples.

Test Methods

The following test methods were used in the following Examples.

Linear Density. The linear density of a yarn or fiber is determined by weighing a known length of the yarn or fiber based on the procedures described in ASTM D1907-97 and D885-98. Decitex or "dtex" is defined as the weight, in grams, of 10,000 meters of the yarn or fiber.

In actual practice, the measured dtex of a yarn sample, test conditions, and sample identification are fed into a computer before the start of a test; the computer records the load-elongation curve of the yarn as it is broken and then calculates the properties.

Tensile Properties. The fibers to be tested are conditioned and then tensile tested based on the procedures described in ASTM D885-98. Tenacity (breaking tenacity), elongation to break, and modulus of elasticity are determined by breaking test fibers on an Instron tester (Instron Engineering Corp., Canton, Mass.).

Areal Density. The areal density of the fabric layer is determined by measuring the weight of each single layer of selected size, e.g., 10 cm ×10 cm. The areal density of the composite structure is determined by the sum of the areal densities of the individual layers.

Stab Resistance. Spike resistance tests of the multi-layer panels are conducted in accordance with NIJ Standard—0115.00 "Stab Resistance of Personal Body Armor" for protection class of spike, issued in September 2000.

Ballistic Performance. Ballistic V50 tests of the multi-layer panels are conducted in accordance with NIJ Standard—0101.04 "Ballistic Resistance of Personal Body Armor", issued in September 2000.

EXAMPLES AND COMPARATIVE EXAMPLES

In the following examples, composites of a plurality of fabric layers were prepared for ballistic and stab penetration resistance tests. Panels of about 16"×16" (40.6 cm ×40.6 cm) were constructed for the tests. Several different fabrics made from aramid yarns of different linear density and different number of filament crossovers were used for spike and ballistic resistant panels, respectively. The aramid yarn was sold by E. I. du Pont de Nemours and Company under the trademark Kevlar®. The aramid was poly(p-phenylene terephthalamide). The spike and ballistic resistant panels stacked together as a combined system, at two different levels of areal densities of about 4.8 kg/m$^2$ and 5.9 kg/m$^2$, respectively, were tested for comparison on both stab and ballistic performance.

A filament crossover is an instance where one of the filaments in the warp direction crosses over one of the filaments in the fill direction. The number of filament crossover points is based on the number of filaments per end in the warp and fill direction and the total number of ends per inch (or per cm, if specified). The number of crossover points is calculated by multiplying the number of filaments in a fiber times the number of fibers per inch (or per cm, if specified) in the weave in the warp direction and then multiplying that amount by the number of filaments in a crossing fiber times the number of the crossing fibers per inch (or per cm, if specified) in the weave in the fill direction. For example, the total number of filament crossover points for various fabric constructions was calculated as follows:

| | Warp Yarn | | | Fill Yarn | | | Cross Over Points Per |
|---|---|---|---|---|---|---|---|
| Item | Denier (Dtex) | Filaments Per End | Ends Per Inch (Per cm) | Denier (Dtex) | Filaments Per End | Ends Per Inch (Per cm) | Square Inch (Per Square cm) |
| 1 | 200 (220) | 133 | 70 (27.6) | 200 (220) | 133 | 70 (27.6) | 86,676,100 (13,434,822) |
| 2 | 300 (330) | 200 | 63 (24.9) | 300 (330) | 200 | 63 (24.9) | 158,760,000 (24,607,849) |
| 3 | 400 (440) | 267 | 50 (19.7) | 400 (440) | 267 | 50 (19.7) | 178,222,500 (27,624,543) |
| 4 | 200 (220) | 133 | 110 (43.3) | 400 (440) | 267 | 66 (26.0) | 257,809,860 (39,960,608) |

The calculation of number of filament crossovers per square inches (or per square cm, if specified) for several different plain weave fabrics made of different linear density of yarn, end counts per inch (or per cm, if specified), and number of filament per end is exemplified for reference.

| Linear Density in denier (dtex) | Filaments Per End | Ends Per Inch (Per cm) | Cross Over Points Per Square Inch (Per Sq cm) |
|---|---|---|---|
| 150 (167) | 100 | 80 × 80 (31.5 × 31.5) | 64,000,000 (9,920,019) |
| 200 (220) | 133 | 70 × 70 (27.6 × 27.6) | 86,676,100 (13,434,822) |
| 300 (330) | 200 | 63 × 63 (24.8 × 24.8) | 158,760,000 (24,607,849) |

-continued

| Linear Density in denier (dtex) | Filaments Per End | Ends Per Inch (Per cm) | Cross Over Points Per Square Inch (Per Sq cm) |
|---|---|---|---|
| 400 (440) | 267 | 50 × 50 (19.7 × 19.7) | 178,222,500 (27,624,543) |
| 400 (440) | 267 | 26 × 26 (10.2 × 10.2) | 48,191,364 (7,469,676) |
| 400 (440) | 267 | 31 × 31 (12.2 × 12.2) | 68,508,729 (10,618,874) |
| 750 (832) | 500 | 18 × 18 (7.1 × 7.1) | 81,000,000 (12,555,025) |
| 840 (930) | 560 | 26 × 26 (10.2 × 10.2) | 211,993,600 (32,859,074) |

Comparative Example 1

In Comparative Example 1, twelve layers of fabric woven from 220 dtex Kevlar® aramid containing 133 filaments at 70 ends per inch (27.6 ends per cm) in a plain weave were used as the spike resistant component. The number of filament crossovers per square inch (per square cm) for the spike resistant component was 86,676,100 (13,434,822), which was less than 90,000,000 (13,950,027). The areal density of the spike resistant component was about 1.5 kg/m$^2$. In addition, sixteen layers of fabrics woven from 930 dtex Kevlar® aramid containing 560 filaments at 26 ends per inch (10.2 ends per cm) construction in a plain weave were used as the ballistic resistant component. The number of filament crossovers per square inch (per square cm) for the ballistic resistant component was 211,993,600 (32,859,074) which was greater than 90,000,000 (13,950,027). The areal density of the ballistic resistant component was 3.2 kg/m$^2$. The total areal density of the combined spike and ballistic resistant panels was about 4.7 kg/m$^2$.

The stab resistant test on the combined panels against the spike showed good stab resistance, i.e., no penetration when tested at 36 Joules and at 43 Joules, respectively. Ballistic V50 resistants tests on the combined panels showed respectable ballistic V50s of 467 m/sec against a 9 mm bullet and 434 m/sec against a 40 S&W bullet.

Example 1

In this example, twelve layers of fabric woven from 220 dtex Kevlar® aramid containing 133 filaments at 70 ends per inch (27.6 ends per cm) construction in a plain weave were used as the spike resistant component. The number of filament crossovers per square inch (per square cm) for the spike resistant component was 86,676,100 (13,434,822), which was less than 90,000,000 (13,950,027). The areal density of the spike resistant component was 1.5 kg/m$^2$. In addition, twenty-eight layers of fabrics woven from 440 dtex Kevlar® aramid containing 267 filaments at 31 ends per inch (12.2 ends per cm) construction in a plain weave were used as the ballistic resistant component. The areal density of the ballistic resistant component was about 3.2 kg/m2 . The number of filament crossovers per square inch (per square cm) for the ballistic resistant component was 68,508,729 (10,618,874), which was significantly less than 90,000,000 (13,950,027). The total areal density of the combined spike and ballistic resistant panels was 4.7 kg/m$^2$.

The stab resistant test on the combined panels against the spike showed good stab resistance, i.e., no penetration when tested at 36 Joules and at 43 Joules, respectively. Ballistic V50 resistant tests on the combined panels against 9 mm and 40 S&W bullets were conducted. The article of this invention with the ballistic resistant panel constructed with the number of filament crossovers per square inch (per square cm) less than 90,000,000 (13,950,027) exhibited improved ballistic V50s of 496 m/sec against a 9 mm bullet and 461 m/sec against a 40 S&W bullet, which were about 7% and 6% higher than those of the Comparative Example 1, respectively.

Example 2

In this example, ten layers of fabric woven from 440 dtex Kevlar® aramid containing 267 filaments at 50 ends per inch (_19.7_ends per cm) construction in a plain weave were used as the spike resistant component. The number of filament crossovers per square inch (per square cm) for the spike resistant component was 178,222,500 (27,624,543) which was significantly higher than 90,000,000 (13,950,027). The areal density of the spike resistant component was 1.7 kg/m$^2$. In addition, thirty-four layers of fabrics woven from 440 dtex Kevlar® aramid containing 267 filaments at 26 ends per inch (10.2 ends per cm) construction in a plain weave were used as the ballistic resistant component. The number of filament crossovers per square inch (per square cm) for the ballistic resistant component was 48,191,364 (7,469,676), which was significantly less than 90,000,000 (13,950,027). The areal density of the ballistic resistant component was 3.2 kg/m$^2$. The total areal density of the combined spike and ballistic resistant panels was about 4.9 kg/m$^2$.

The stab resistant test on the combined panels against the spike showed very good stab resistance, i.e., no penetration when tested at 36 Joules and at 43 Joules, respectively. A Ballistic V50 resistant test was conducted on the combined panels. The article of this invention with the ballistic resistant panel constructed with the number of filament crossovers per square inch (per square cm) significantly less than 90,000,000 (13,950,027) exhibited a significant higher ballistic V50s of 507 m/sec against a 9 mm bullet and 468 m/sec against a 40 S&W bullet, which is about 9% and 8% higher than those of the Comparative Example 1, respectively.

Example 3

In this example, ten layers of fabric woven from 330 dtex Kevlar® aramid containing 150 filaments at 63 ends per inch (24.8 ends per cm) construction in a plain weave were used as the spike resistant component. The number of filament crossovers per square inch (per square cm) for the spike resistant component was 158,760,000 (24,607,849) which was significantly higher than 90,000,000 (13,950,027). The areal density of the spike resistant component was 1.6 kg/m$^2$. In addition, twenty-five layers of fabrics woven from 440 dtex Kevlar aramid containing 267 filaments at 35 ends per inch (13.8 ends per cm) construction in a plain weave were used as the ballistic resistant component. The number of filament crossovers per square inch (per square cm) for the ballistic resistant component was 87,329,025 (13,536,026), which was less than 90,000,000 (13,950,027). The areal density of the ballistic resistant component was 3.2 kg/m². The total areal density of the combined spike and ballistic resistant panels was about 4.8 kg/m².

The stab resistant test on the combined panels against the spike showed very good stab resistance, i.e., no penetration when tested at 36 Joules and at 43 Joules, respectively. A Ballistic V50 resistant test was conducted on the combined panels. The article of this invention with the ballistic resistant panel constructed with the number of filament crossovers per square inch (per square cm) less than 90,000,000 (13,950,027) exhibited a significant higher ballistic V50 of 487 m/sec against a 9 mm bullet and 466 m/sec against a 40 S&W bullet, which were about 5% and 7% higher than those of the Comparative Example 1, respectively.

Comparative Example 2

In Comparative Example 2, twelve layers of fabric woven from 220 dtex Kevlar® aramid containing 133 filaments at 70 ends per inch (27.6 ends per cm) construction in a plain weave were used as the spike resistant component. The number of filament crossovers per square inch (per square cm) for the spike resistant component was 86,676,100 (13,434,822), which was less than 90,000,000 (13,950,027). The areal density of the spike resistant component was 1.5 kg/m². In addition, twenty-two layers of fabrics woven from 930 dtex Kevlar® aramid containing 560 filaments at 26 ends per inch (10.2 ends per cm) construction in a plain weave were used as the ballistic resistant component. The number of filament crossovers per square inch (per square cm) for the ballistic resistant component was 211,993,600 (32,859,074) which was greater than 90,000,000 (13,950,027). The areal density of the ballistic resistant component was 4.4 kg/m². The total areal density of the combined spike and ballistic resistant panels was 5.9 kg/m².

The stab resistant test on the combined panels against the spike showed good resistance against spike, i.e., no penetration when tested at 36 Joules and at 43 Joules, respectively. Ballistic resistant test on the combined panels against a 9 mm bullet showed a respectable ballistic V50 of 509 m/sec.

Example 4

In this example, twelve layers of fabric woven from 220 dtex Kevlar® aramid containing 133 filaments at 70 ends per inch (27.6 ends per cm) construction in a plain weave were used as the spike resistant component. The number of filament crossovers per square inch (per square cm) for the spike resistant component was 86,676,100 (13,434,822), which was less than 90,000,000 (13,950,027). The areal density of the spike resistant component was 1.5 kg/m². In addition, thirty-nine layers of fabrics woven from 440 dtex Kevlar® aramid containing 267 filaments at 31 ends per inch (12.2 ends per cm) construction in a plain weave were used as the ballistic resistant component. The areal density of the ballistic resistant component was 4.3 kg/m². The number of filament crossovers per square inch (per square cm) for the ballistic resistant component was 68,508,729 (10,618,874), which was significantly less than 90,000,000 (13,950,027). The total areal density of the combined spike and ballistic resistant panels was 5.8 kg/m².

The stab resistant test on the combined panels against the spike also showed good stab resistance, i.e., no penetration when tested at 36 Joules and at 43 Joules, respectively. Ballistic resistant test on the combined panels against a 9 mm bullet was conducted. The article of this invention with the ballistic resistant panel constructed with the number of filament crossovers per square inch (per square cm) less than 90,000,000 (13,950,027) exhibited an improved ballistic V50 of 521 m/sec against a 9 mm bullet, which was higher than that of the Comparative Example 2.

Example 5

In this example, nine layers of fabric woven from 440 dtex Kevlar® aramid containing 267 filaments at 50 ends per inch (19.7 ends per cm) construction in a plain weave were used as the spike resistant component. The number of filament crossovers per square inch (per square cm) for the spike resistant component was 178,222,500 (27,624,543) which was significantly higher than 90,000,000 (13,950,027). The areal density of the spike resistant component was 1.6 kg/m². In addition, forty-six layers of fabrics woven from 440 dtex Kevlar® aramid containing 267 filaments at 26 ends per inch (10.2 ends per cm) construction in a plain weave were used as the ballistic resistant component. The number of filament crossovers per square inch (per square cm) for the ballistic resistant component was 48,191,364 (7,469,676), which was significantly less than 90,000,000 (13,950,027). The areal density of the ballistic resistant component was 4.3 kg/m². The total areal density of the combined spike and ballistic resistant panels was 5.9 kg/m².

The stab resistant test on the combined panels against the spike showed very good stab resistance, i.e., no penetration when tested at 36 Joules and at 43 Joules, respectively. Ballistic resistant test was conducted on the combined panels. The article of this invention with the ballistic resistant panel constructed with the number of filament crossovers per square inch (per square cm) significantly less than 90,000,000 (13,950,027) exhibited a significant higher ballistic V50 of 540 m/sec against a 9 mm bullet, which was about 6% higher than that of the Comparative Example 2.

What is claimed is:

1. A spike and ballistic resistant article, consisting essentially of:
   a spike resistant panel comprising a plurality of flexible layers of a first fabric positioned adjacent to one another, the first fabric made of a first plurality of first yarns in a warp direction and a second plurality of first yarns in a fill direction, wherein the first yarns have a linear density of from 50 to 600 denier and comprise of plurality of first filaments; and further wherein the first plurality and the second plurality of first yarns comprise from 40 to 100 first yarns per inch which provide from more than 90,000,000 to no more than 250,000,000 filament crossovers per square inch in said first fabric; and
   a ballistic resistant panel comprising a plurality of flexible layers of a second fabric positioned adjacent to one another, the second fabric layers made of a first plurality of second yarns in a warp direction and a second plurality of second yarns in a fill direction, wherein the second yarns have a linear density of from 100 to no more than 840 denier and wherein the second yarns comprise a plurality of second filaments which provide from 20,000,000 to no more than 90,000,000 filament crossovers per square inch in said second fabric and further wherein the first plurality and the second plurality of second yarns comprise from 5 to less than 40 second yarns per inch.

2. The article of claim 1, wherein the second filaments provide from 35,000,000 to 85,000,000 filament crossovers per square inch.

3. The article of claim 1, wherein the first and second pluralities of the first yarns are from 45 to 80 first yarns per inch.

4. The article of claim 1, wherein the first and second pluralities of the second yarns are from 10 to 36 second yarns per inch.

5. The article of claim 1, wherein the first and second yarns have a tenacity of at least 10 g/denier and an elongation to break of at least 2%.

6. The article of claim 1, wherein the second yarns have a linear density of from 100 to 800 denier and the second filaments have a linear density of from 0.3 to 8.0 denier.

7. The article of claim 1, wherein the second yarns have a linear density of from 150 to 750 denier and the second filaments have a linear density of from 0.5 to 4.0 denier.

8. The article of claim 1, wherein the first yarns have a linear density of from 50 to 600 denier and the first filaments have a linear density of from 0.3 to 8.0 denier.

9. The article of claim 1, wherein the first yarns have a linear density of from 100 to 500 denier and the first filaments have a linear density of from 0.5 to 4.0 denier.

10. The article of claim 1, wherein the spike resistant panel has an areal density of from 0.15 to no more than 1.50 pounds per square foot.

11. The article of claim 1, wherein the spike resistant panel has an areal density of from 0.20 to no more than 0.90 pounds per square foot.

12. The article of claim 1, wherein the spike resistant panel comprises from 2 to 32 first fabric layers and the ballistic resistant panel comprises from 10 to 70 second fabric layers.

13. The article of claim 1, wherein the spike resistant panel comprises from 5 to 25 first fabric layers and the ballistic resistant panel comprises from 15 to 60 second fabric layers.

14. The article of claim 1, wherein at least one of the first fabric layers and at least one of the second fabric layers is woven.

15. The article of claim 1, wherein all of the first fabric layers and all of the second fabric layers are woven.

16. The article of claim 1, wherein the first and second yarns independently comprise a plurality of fibers selected from the group consisting of polyamide fibers, polyolefin fibers, polybenzoxazole fibers, polybenzothiazole fibers, poly{2,6-diimidazo[4,5-b4', 5'-e]pyridinylene-1 ,4(2,5-dihydroxy)phenylene}, and mixtures thereof.

17. The article of claim 1, wherein the spike resistant panel is the strike face.

18. The article of claim 1, wherein the article comprises the spike resistant panel as a strike face, the ballistic resistant panel as an intermediate layer, and a second spike resistant panel as an inner face for positioning against body of a wearer of the article.

19. The article of claim 1, wherein the first fabric layers include a matrix resin or binder.

20. The article of claim 1, wherein the second fabric layers include a matrix resin or binder.

21. The article of claim 1, wherein the article has a ballistic V50 performance greater than that of a second article comprising a spike resistant panel and a ballistic resistant panel in which the ballistic resistant panel in the second article has the same areal density as the ballistic resistant panel of the first article but wherein a number of filament crossovers per square inch in the ballistic resistant panel of the second article is more than 90,000,000.

22. The article of claim 1, wherein the V50 ballistic performance of the article against a 9 mm bullet is at least 350 in/sec.

23. A spike and ballistic resistant article, consisting essentially of:
a first penetration resistant panel comprising a plurality of flexible layers of a first fabric positioned adjacent to one another, the first fabric made of a first plurality of first yarns in a warp direction and a second plurality of first yarns in a fill direction, wherein the first yarns have a linear density of from 50 to 600 denier and comprise of plurality of first filaments; and further wherein the first plurality and the second plurality of first yarns comprise from 40 to 100 first yarns per inch which provide from more than 90,000,000 to no more than 250,000,000 filament crossovers per square inch in said first fabric; and
a second penetration resistant panel comprising a plurality of flexible layers of a second fabric positioned adjacent to one another, the second fabric layers made of a first plurality of second yarns in a warp direction and a second plurality of second yarns in a fill direction, wherein the second yarns have a linear density of from 100 to no more than 840 denier and wherein the second yarns comprise a plurality of second filaments which provide from 20,000,000 to no more than 90,000,000 filament crossovers per square inch in said second fabric and further wherein the first plurality and the second plurality of second yarns comprise from 5 to less than 40 second yarns per inch.

* * * * *